(12) United States Patent
Sieben et al.

(10) Patent No.: US 10,899,455 B2
(45) Date of Patent: Jan. 26, 2021

(54) SEAT ARRANGEMENT FOR AN INTERIOR SPACE OR A PASSENGER CABIN OF A VEHICLE, AS WELL AS A RESPECTIVE VEHICLE

(71) Applicant: Airbus Operations GmbH, Hamburg (DE)

(72) Inventors: Martin Sieben, Hamburg (DE); Thomas Sütthoff, Hamburg (DE); Tobias Schmidt-Schäffer, Hamburg (DE)

(73) Assignee: Airbus Operations GmbH

( * ) Notice: Subject to any disclaimer, the term of this patent is extended or adjusted under 35 U.S.C. 154(b) by 641 days.

(21) Appl. No.: 15/661,430

(22) Filed: Jul. 27, 2017

(65) Prior Publication Data

US 2018/0029712 A1 Feb. 1, 2018

(30) Foreign Application Priority Data

Jul. 29, 2016 (DE) .......................... 10 2016 114 124

(51) Int. Cl.
*B64D 11/06* (2006.01)
*B60N 2/00* (2006.01)
*B60N 2/01* (2006.01)

(52) U.S. Cl.
CPC ............ *B64D 11/0601* (2014.12); *B60N 2/00* (2013.01); *B60N 2/01* (2013.01); *B64D 11/0602* (2014.12);
(Continued)

(58) Field of Classification Search
CPC ............ B64D 11/0601; B64D 11/0602; B64D 11/0606; B64D 11/064
See application file for complete search history.

(56) References Cited

U.S. PATENT DOCUMENTS

| 7,178,871 B1 | 2/2007 | Round et al. |
| 2011/0210204 A1* | 9/2011 | Collins .............. B64D 11/0643 244/118.6 |

(Continued)

FOREIGN PATENT DOCUMENTS

| DE | 112009002229 T5 | 7/2011 |
| EP | 1364874 B1 | 3/2006 |

(Continued)

OTHER PUBLICATIONS

The German Patent and Trade Mark Office, Search Report for German Patent Application No. 10 2016 114 124.0 dated Apr. 5, 2017.

*Primary Examiner* — Philip J Bonzell
*Assistant Examiner* — Tye William Abell
(74) *Attorney, Agent, or Firm* — Lerner, David, Littenberg, Krumholz & Mentlik, LLP

(57) ABSTRACT

A seat arrangement for a vehicle has: parallel aisles in a longitudinal direction of a cabin; cabin walls arranged parallel to the aisles; a central region enclosed by the aisles; and two outer regions neighboring the central region and separated from the central region through the aisles. Seat rows having two inner seat modules and two outer seat modules, are arranged in the central region behind each other. Additional seat rows having an inner seat module facing the respective aisle and an outer seat module wall facing the respective cabin wall, are arranged behind each other in the outer regions. Each seat module has a seat and an ottoman. The seat modules of the central region have a use direction aligned parallel to a main extension direction of the bordering aisle or enclose a maximum angle such that the ottoman reaches further into the aisle than the assigned seat.

13 Claims, 3 Drawing Sheets

(52) U.S. Cl.
CPC ........ *B64D 11/064* (2014.12); *B64D 11/0606* (2014.12)

(56) References Cited

U.S. PATENT DOCUMENTS

| | | | | |
|---|---|---|---|---|
| 2013/0106156 A1* | 5/2013 | Orson | .................. | B64D 11/064 297/217.3 |
| 2014/0306500 A1* | 10/2014 | Dryburgh | ........... | B64D 11/0604 297/232 |
| 2015/0166182 A1* | 6/2015 | Ducreux | ............ | B64D 11/0601 244/118.6 |
| 2016/0016667 A1* | 1/2016 | Schmidt-Schaffer | ........................ | B64D 11/0643 244/118.6 |
| 2017/0327232 A1* | 11/2017 | Morgan | ............. | B64D 11/0604 |

FOREIGN PATENT DOCUMENTS

| | | |
|---|---|---|
| EP | 2303692 B1 | 11/2013 |
| EP | 2783985 A1 | 10/2014 |
| WO | 2014049362 A1 | 4/2014 |

\* cited by examiner

SEAT ARRANGEMENT FOR AN INTERIOR SPACE OR A PASSENGER CABIN OF A VEHICLE, AS WELL AS A RESPECTIVE VEHICLE

CROSS-REFERENCE TO PRIORITY APPLICATION

This application claims the benefit of, and priority to, German patent application number 102016114124.0, filed Jul. 29, 2016.

TECHNICAL FIELD

Embodiments of the invention relate to a seat arrangement for a cabin of a vehicle, a cabin of a vehicle, and an aircraft having such a cabin.

BACKGROUND

Besides simple passenger seats, also larger seat modules having a seat and an ottoman may be placed in cabins of commercial aircraft that are equipped with different seating classes. These seat modules are often reconfigurable between a seating position and a reclining position on demand. In a seating position, a seat surface of the seat is placed in a clear distance to the ottoman, while in a reclining position, the seat surface, the ottoman and possibly an additional seat element constitute a closed lying surface. The integration of this kind of seat modules requires a clearly larger installation space than a simple passenger seat in particular due to the length extension.

Seating classes are known with which two aisles that extend parallel to each other are arranged in a cabin, between which a center passenger region is positioned, in which two of those seat modules are arranged next to each other, while multiple groups of two seat modules are arranged one behind each other. With such an arrangement, the seat modules often enclose an angle with each other, such that two seat modules arranged next to each other complement to a V-shape. In lateral outer regions between cabin wall and an aisle, arrangements are known, in which individual seat modules are arranged one behind each other. In a longitudinal direction of the cabin, these often reach further into the aisle with the ottoman than with the associated seat. Consequently, each of these seat modules is directly accessible from a bordering aisle.

For example, in German patent document DE 11 2009 002 229 T5, a passenger seat system with an integrated multifunctional piece of furnishing is proposed, with which a compact, integrated combination of a plurality of subsequently arranged seat modules, which reach into an aisle with their ottoman each, is shown.

United States patent publication 2015/0166182 A1 shows a similar variant, in which seat modules face away from an aisle also with their ottoman.

European patent document EP 1 364 874 B1 shows single modules for aircraft passengers having a seat, armrests and an equipment element opposite and at a distance to the seat, wherein a sidewall extends between a side of the seat and a side of the equipment element and thereby defines an elongate shape having a first end and a second end, wherein the seat is arranged at a wider end and the equipment element at a more narrow end and wherein an access opening is arranged opposite the sidewall between the ends.

European patent document EP 2 303 692 B1 shows a seat module for an aircraft passenger, comprising a seat having a horizontal seat cushion and a backrest as well as a partition wall, which extends along at least one side of the seat, wherein the seat is adapted for being movable between a straight position, in which the backrest of the seat extends approximately vertical and a reclined position, in which the backrest lies in a plane, which extends approximately vertical to the partition wall.

European patent document EP 2 783 985 A1 shows an arrangement with a plurality of seats, which are convertible between a seating configuration and a lying configuration through moving a seat cushion and a backrest.

BRIEF SUMMARY

Without doubt, the use of such seat modules with seat and ottoman may clearly increase the comfort of an individual passenger. However, due to the installation space consuming integration, only few passengers may be accommodated per area unit in a certain cabin section. Thereby, the economic efficiency of the vehicle or the costs for the individual passenger, respectively, may be influenced.

An advantage of an embodiment of the invention is to achieve a more efficient use of the installation space within a certain cabin section of a vehicle, without reducing the comfort for an individual passenger achieved by such seat modules, while at the same time, the economic efficiency is increased.

In accordance with an embodiment, a seat arrangement for a cabin of a vehicle has the features of the independent claim 1. Advantageous embodiments and further improvements can be gathered from the sub-claims and the following description.

A seat arrangement for a cabin of a vehicle is proposed, the seat arrangement comprising two aisles extending parallel and at a distance to each other, which aisles are aligned in a longitudinal direction of the cabin, two cabin walls at a distance to each other, which are arranged parallel to the aisles at least in a region and laterally delimit the cabin, a central passenger region enclosed by the aisles, and two outer passenger regions neighboring the central section, which are separated from the central passenger region through one of the aisles each and border at one of the two cabin walls. A plurality of first seat rows having two central and two outer seat modules each, are arranged in the central passenger region in the longitudinal direction one behind each other, a plurality of second seat rows, each having an inner seat module facing the respective aisle and an outer cabin wall facing the respective cabin wall are arranged one behind each other in the outer passenger regions, wherein each seat module comprises a seat and an ottoman assigned to the seat.

Consequently, the seat arrangement is designed for cabins having a relatively great width, such that it may be installed in "wide body" aircraft. These cabins are characterized by the aisles running in the longitudinal direction, which virtually extend through the whole interior space of the aircraft. For example, this may refer to an aircraft of the type A350 or an aircraft having a similar setup and a cabin having a cabin width of approximately 5.5 m or more.

As explained above, a seat module may relate to a unit or a combination of a passenger seat and an ottoman, which may clearly increase the individual passenger comfort. In a seat position of the seat module, a free intermediate space between a leading edge of the passenger seat and the ottoman is created, such that the passenger may comfortably sit on the passenger seat having a sufficient leg room and may lay his feet onto the ottoman when desired. In a reclining position, the ottoman and the passenger seat may be converted to a closed lying surface through respective swiveling and moving mechanisms, which are integrated into the seat module.

It is understandable that disturbing a passenger in a seat module should be avoided as much as possible, in particular during boarding the vehicle and during the travel. This may be accomplished by avoiding to pass the seat module that faces the aisle in case two seat modules next to each other are used, from which only one seat module borders an aisle. This is possible if such a distance between two consecutive seat modules at an aisle side is provided that allows passing this intermediate space. Thereby, a passenger may reach a seat module that faces away from the aisle without entering the seat module that faces the aisle.

Furthermore, by the above-defined embodiment it is implicitly defined that both respective seat modules, which are arranged so as to be neighboring, comprise a displacement to each other. If for example a passenger passes the intermediate space between two consecutive seat modules at an aisle side, he would reach a region of the seat module that faces away from the aisle, which region faces away from the passenger seat and the ottoman. Due to the displacement in the longitudinal direction, an aisle between the consecutive seat modules at the aisle side and an intermediate space between seat and ottoman of the seat module facing away from the aisle is achieved. The utilization of the installation space and the vehicle is thereby clearly improved, since seat modules facing away from the aisle, which are accessible for a passenger directly from the aisle without disturbing a passenger on a seat module that directly connects to the respective aisle, can be realized.

It is preferred that the seat modules of the central passenger region comprise a use direction, which are aligned parallel to a main extension direction of the bordering aisle or enclose an angle of 4 degrees with it as a maximum in such a way, that the ottoman of the respective seat module reaches further into the respective aisle than the assigned seat. In particular in combination with the seat modules that directly border the respective aisle having a use direction, which substantially equals the main extension direction of the respective aisle, a decoupling of the neighboring seat modules is accomplished in order to improve the privacy of the respective passengers. The angle between the use direction and the main extension direction of the aisle leads to distancing the ottoman of the outer seat module, i.e., the seat module facing the aisle, from the seat module that is facing away from the aisle.

It is advantageous if a distance of at least 20 cm is provided between an ottoman of a seat module facing an aisle and a seat of a seat module in front of it along the longitudinal direction, through which distance the seat module facing away from the respective aisle is accessible from the respective aisle. The distance between the two consecutive seat modules must be dimensioned sufficiently, in order to reach the seat module that faces away from the aisle. A limit of 20 cm may be considered a conceivable minimum. However, it is also conceivable that the distance between the consecutive seat modules may be dimensioned larger, in order to reduce the comfort for accessing the respective seat module only to a minimum. For example, a value of 9 inches (23 cm) or more may be used.

In an advantageous embodiment, the seats of two neighboring seat modules comprise a displacement in the longitudinal direction. The size of the displacement depends on the design of the space between the distanced seat modules at an aisle side. The passage may enclose an angle with the main extension direction of the respective aisle, which differs from 90 degrees. Depending on the choice of this angle, the walking direction of the passenger from the respective aisle through the passage is determined, which consequently also determines a convenient entry point into the outer seat module. This in turn determines the longitudinal displacement of the seats of the neighboring seat modules.

In an advantageous embodiment of a seat arrangement, the seats of an outer seat module of the central passenger region comprise a displacement of 30 cm as a maximum, preferably 25 cm as a maximum. Such a displacement may define a minimum displacement, which just allows the access from an aisle to a seat module that is at a distance from the aisle.

However, the seats of an inner seat module of the outer passenger regions may comprise a displacement of at least 40 cm, preferably of at least 50 cm. The displacement, which is larger in comparison to the central passenger region, may improve the entry situation and may improve the service to a seat module that is facing to the cabin wall or to a window, respectively. The distance between the aisle and the respective seat module underneath overhead bins, which are often positioned lower in lateral regions, is optimized. This may particularly be achieved through simultaneous enlargement of the V position of the seat modules. The more prominent inclined position of the inner seat modules positioned at the respective aisle is helpful for this purpose, which is explained further below. Furthermore, in combination with a movable support of ottomans of the seat modules bordering the aisles, a wider aisle and altogether a larger usable aisle area may be achieved.

In an advantageous embodiment, a passage is created between two consecutive inner seat modules in an outer passenger region or two consecutive outer seat modules in the central passenger region, which passage encloses an angle with a main extension direction of a bordering aisle that is in a range of 45 degrees to 135 degrees. Consequently, the passage is not to be passed perpendicularly to the aisle, but in an angle that differs from the main extension direction by up to 45 degrees with or opposed to the main extension direction. Preferably, the angle is in a range of 65 degrees to 115 degrees and preferably in a range of 75 degrees to 105 degrees. A displacement between two neighboring seat modules may be designed in such a way that the outer seat, i.e. the seat facing away from the aisle, is displaced further along or opposed to the main extension direction of the aisle, such that a passenger may reach the intermediate space between seat and ottoman of the outer seat module after passing the passage. For emphasizing the orientation of this passage, the shaping of the ottomans and/or the backrests and/or a lining shell of the passenger seat of the seat module that borders the aisle may be adapted thereto.

Also, the inner seat modules of the outer passenger region may each comprise a use direction, which encloses an angle of at least 4 degrees to the main extension direction of the respective bordering aisle. The ottoman of the inner seat module of the outer passenger region may also reach further into the bordering aisle than the associated seat.

Preferably, the ottomans of the seat modules, which border at an aisle, comprise a construction depth, which decreases from the aisle towards the seat module facing away from the aisle. Thereby, a further improvement of the efficiency of the utilization of space may be accomplished, since a maximum lying surface is reached if the seat module is utilized diagonally, at which both a maximum depth of the ottoman and a diagonal manner of lying are utilized in combination. It is not required to provide an as wide resting surface as possible with a maximum continuous length, since this is only utilized by a fraction of the passengers. This variant may inter alia support the advantageous design of a passage between two consecutive seat modules.

In a particularly advantageous embodiment, the usable minimum width of the aisles is at least 15 inches (38 cm) and preferably at least 16 inches (40.6 cm), which allows moving a full-size trolley according to the Atlas standard having a width of approximately 31 cm. However, due to the partially transverse using direction of the seat module connecting to the respective aisle, an additional avoidance space is provided, in case two persons want to pass each other in the aisle. Thereby, the passage regions between the consecutively arranged seat modules may be utilized.

In a preferred embodiment, the ottomans of at least the seat modules that border the aisle comprise a base that is attachable to a cabin floor and a support that is movable relative to the base, wherein in a seating position of the first seat the support is held in a retracted position on the base, in which the support protrudes over the base to a minimum possible extent and wherein in a reclining position the support is deflected into the bordering aisle. In operating phases of the vehicle, in which serving of meals or increased passenger traffic on the aisles is not to be expected, the aisle width may be reduced to a certain extent, without reducing the comfort within the vehicle. It is conceivable that the supports of the respective ottomans are moved about a distance of up to 2 inches or more into the aisle, depending on its initial width.

The support may exemplarily be held on the base through a passive mechanism comprising a spring arrangement and is adapted to be pushed into a deflected position through a seat cushion of the seat displaced to the ottoman. The design of the ottoman may thereby be conducted rather simple and an elaborate active control is thereby not necessary.

As an alternative thereto, the support may be held on the base through an active mechanism comprising at least one actuator and may be adapted for moving into a deflected or retracted position upon moving the seat cushion of the respective passenger seat. Hereby, more complex motion sequences as well as a larger freedom of motion in a seating position may be achieved.

Preferably, in a deflected position the support protrudes into the first aisle up to a distance of 4 inches and preferably up to a distance of 2 inches. The initial width of the aisle may be 18 inches. With a support being moved into the aisle, its width may be reduced, e.g., to 16 inches.

It is advantageous if two neighboring seat modules comprise an overlapping degree between 25% and 75% in the longitudinal direction. The length displacement in outer passenger regions may be stronger than in the central passenger region. The overlapping degree may consequently be larger in an outer passenger region than in the central passenger region.

Embodiments of the invention further relate to a vehicle, comprising a fuselage with a cabin arranged therein having a seat arrangement according to the preceding description. In particular, the vehicle may be an aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and application options are disclosed in the following description of the exemplary embodiments in the figures. All the described and/or illustrated characteristics per se and in any combination form the subject matter presented here invention, even irrespective of their composition in the individual claims or their interrelationships. Furthermore, identical or similar components in the figures have the same reference characters.

DETAILED DESCRIPTION

Figure 1:
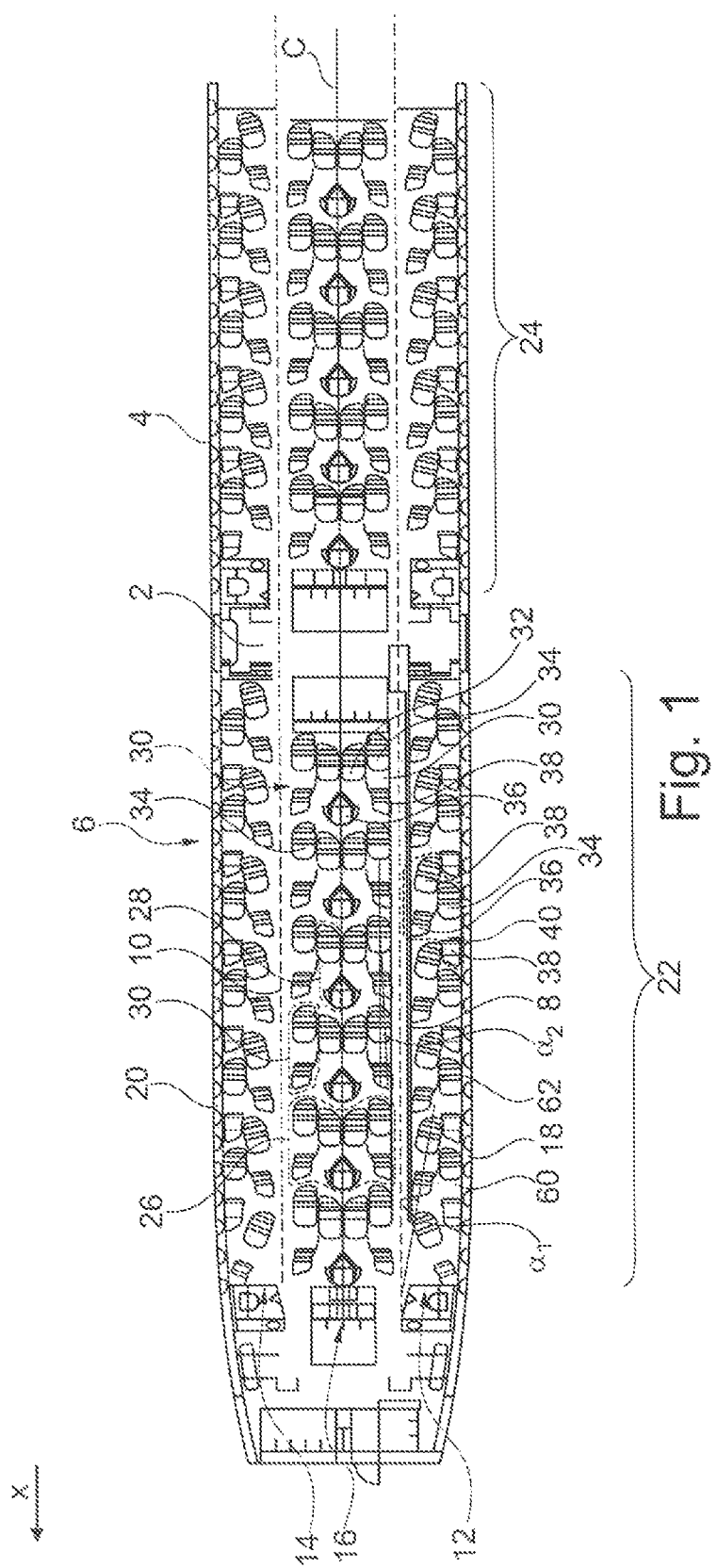
FIG. 1 shows a schematic view of a seat arrangement in a cabin of an aircraft.

FIG. 1 shows a cabin 2 in an aircraft fuselage 4 with a seat arrangement 6 positioned therein. The seat arrangement 6 comprises a first aisle 8, a second aisle 10, a first outer passenger region 12, a second outer passenger region 14 as well as a central passenger region 16. Both aisles 8 and 10 extend parallel to a longitudinal direction x of the cabin 2, are arranged at a distance to each other and enclose the central passenger region 16. Between a cabin wall 18 arranged at the left side in flight direction and the first aisle 8, the first outer passenger region 12 is enclosed. In the same way, the second outer passenger region 14 is enclosed between the second aisle 10 and the cabin wall 20 on the right side in flight direction. Exemplarily, the seat arrangement 6 comprises two seat arrangement sections 22 and 24, which are separated from each other in longitudinal direction x and are exemplarily designed in the same manner. These may be separated through partitions or monuments from each other.

In the central passenger region 16, a plurality of first seat rows 26 are arranged one behind each other, which comprise two inner seat modules 28 and two outer seat modules 30 each. Each of the seat modules 28 or 30, respectively, comprises a seat 32 or 34, respectively and an ottoman 36 or 38, respectively, which is associated with the seat 32 or 34, respectively. A seat module 28 or 30, respectively, may consequently provide a comfortable seating provision with the possibility to lay feet on a support of an ottoman 36 or 38, respectively. For a further improved comfort, also a resting surface may be created through combination with elements of the seat 32 or 34, respectively.

In an outer passenger region 12 or 14, respectively, a plurality of second seat rows 40 are positioned, which also consist of a seat 32 or 34, respectively, and ottoman 36 and 38, which create an inner seat module 62 bordering an aisle 8 or 10, respectively, and an outer seat module 60 facing away thereof. The concrete arrangement of these components to each other is illustrated in the further following figures in magnified views.

The second seat rows 40 are characterized in that the seat module 60 arranged at the cabin wall 18 or 20, respectively, is only very slightly rotated outwardly from the longitudinal direction x or is arranged parallel thereto. However, the use direction of the seat module 62 connecting to the aisle 8 or 10, respectively, faces inwardly to the respective aisle 8 or 10, respectively, about an angle α1. The angle α1 may be at least 4 degrees. Consequently, two neighboring seat modules 60 and 62 of an outer passenger region 12 or 14, consequently, create a slight V position to each other, wherein the widening of the created V is accomplished along the longitudinal direction x.

This is also the case for a left half and a right half of the central passenger region 16, i.e. the use directions of the seat modules 28 and 30 of both halves slightly widen in the longitudinal direction, i.e. they create a slight V shape. While the inner seat modules 28 are preferably arranged parallel to the longitudinal direction, the outer seat modules 30 comprise an angle α2 to the longitudinal direction, which is 4 degrees as a maximum in certain embodiments, however, preferably 2 degrees as a maximum.

Furthermore, the seat modules connecting to an aisle 8 or 10, respectively, comprise a distance to a seat module arranged in front of it in longitudinal direction x, which allows to reach an outer seat module or a seat module positioned in the cabin center, respectively, through two seat modules bordering an aisle. Furthermore, the seats 32 and 34 are arranged with a displacement to each other along the longitudinal direction, such that an intermediate space between seat and ottoman is easily reachable from the aisle through the respective passage.

Figure 2:
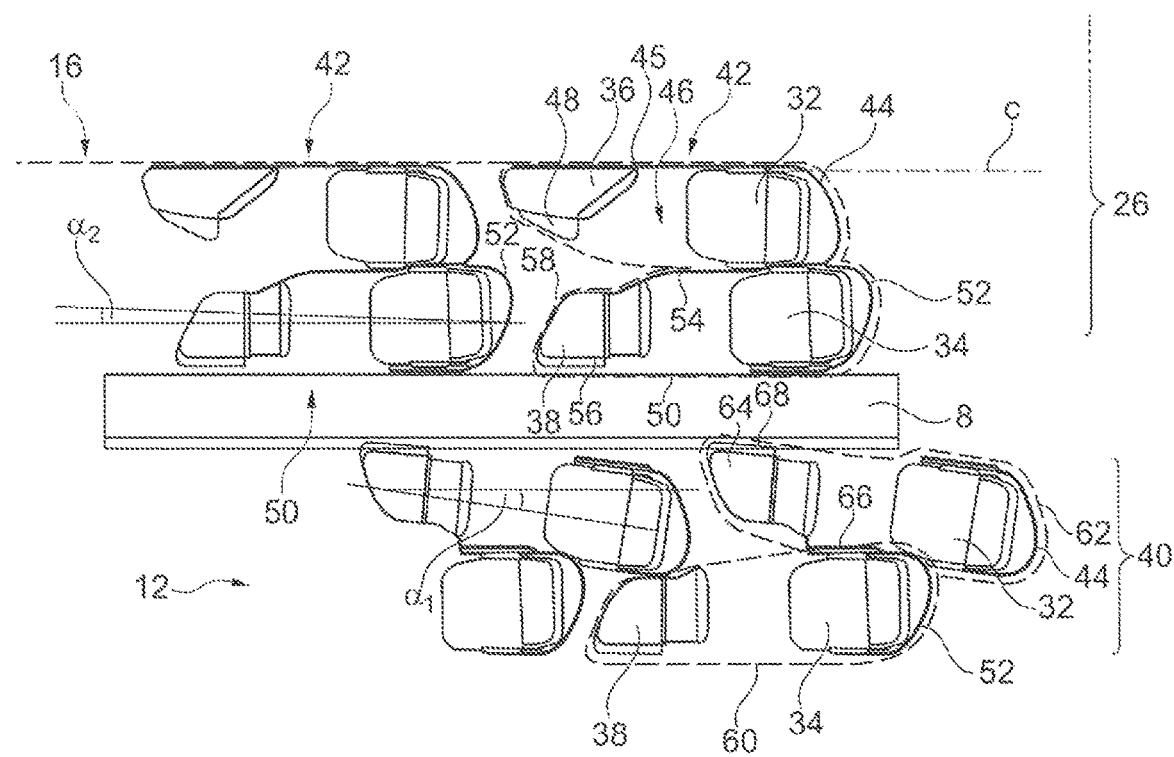
FIG. 2 shows a detail of FIG. 1 in a top view.

FIG. 2 shows a detail of the illustration of FIG. 1 in a top view. Here, only the left half of the seat arrangement in flight direction is shown, which is to be mirrored about the middle axis C. A first inner seat module 42 directly borders the middle axis C and comprises a seat 32, which is arranged parallel to the middle axis C or faces it only slightly. The seat surface of the first seat 32 exemplarily comprises a seat width of 20 inches (50.8 cm) and is shielded at a back side through a seat shell 44.

A first ottoman 36 is assigned to the first seat 32, wherein the first seat 32 and the first ottoman 36 are reconfigurable between a seating position (as shown in FIG. 2) and a reclining position (not shown). In the shown seating position, a free space 46 is arranged between the first seat 32 and the first ottoman 36.

For example, the first ottoman 36 may comprise a support 48, which is held so as to be movable by the passenger on the first seat 32. The support 48 may exemplarily assume a variable distance from the middle axis C.

A first outer seat module 50 is arranged next to the first inner seat module 42, which outer seat module 50 comprises a second seat 34 and an ottoman 38, which is assigned to the second seat 34. The second seat 34 is displaced about a small distance in longitudinal direction under the first seat 32 and directly borders the first aisle 8. The second seat 34 may comprise a substantially mirrored shape as the first seat 32 and is also shielded by a seat shell 52. This extends around the second seat 34 and merges into a side shell 54, which extends up to the second ottoman 38. The first side shell 44 extends around the first seat 32 and joints in a straight first side shell 45, which extends up to the first ottoman 36. Thereby, both seat modules 42 and 50 have a very good shielding and a best possible privacy.

The second ottoman 38 may also comprise a movable support 56, which may assume a variable distance to the first aisle 8.

As exemplarily apparent, a plurality of first seat modules 42 or second seat modules 50 are arranged one behind each other. Between a seat shell 52 and a leading edge 58 of the second ottoman 38, a distance of exemplarily 9 inches (22.9 cm) is present, through which a passenger may reach the first seat module 42 from the first aisle. The leading edge 58 of the second ottoman is beveled in such a manner that it does not extend perpendicularly to a main extension direction of the first aisle 8, but at an angle of exemplarily 15 degrees further against the flight direction. The second seat shell 52 is adapted thereto and consequently extends asymmetrically.

The displacement between the first seat 32 and the second seat 34 together with the gap, which is not perpendicular to the aisle 8, serves for reaching the intermediate space 46 between the first seat 32 and the first ottoman 36 directly from the aisle 8. Consequently, a passenger in the second seat module 50 is not disturbed and flight attendants may very easily reach the passenger in the first seat module 42, too.

A similar constellation is to be found in the lateral passenger region 12, in which a third seat module 60 is arranged at a cabin wall 18, which is not shown here. This third seat module 60 also comprises a first seat 34 and a first ottoman 38, which correspond to those of the second seat module 50. A fourth seat module 62 is arranged directly adjacent to the third seat module 60 and borders the first aisle 8. Here, a seat 32 as well as a mirrored specimen of the ottoman 56 in form of an ottoman 64 are utilized. Between the seats 32 and 34, a displacement is provided, which roughly corresponds to the depth of a seat surface. Exemplarily, a use direction of the fourth seat module 62 is displaced about 7 degrees from a longitudinal direction, such that the ottoman 64 protrudes further into the aisle 8 than the seat 32.

For delimiting the fourth seat module 62 from the third seat module 60, a seat shell 44 extends around the seat 32 and ends at a back shell 52 of the seat 34. The latter encloses the seat 34 and merges into an additional shell component 66, which extends up to the ottoman 64 of the second seat module 62. The use direction of the third seat module 60 is slightly facing the cabin wall 18.

Due to the extendable or movable support 56 or 68, respectively, of the ottoman 38 and 64 that border the aisle, the width of the aisle 8 may exemplarily be reduced from 18 inches to 16 inches. However, this does not limit the comfort of the passengers. Should it be required on the aisle to avoid a person, a serving trolley or the such that appears, it may be waited in the intermediate spaces between two seat modules, until the other person or the serving trolley has passed.

Figure 3:
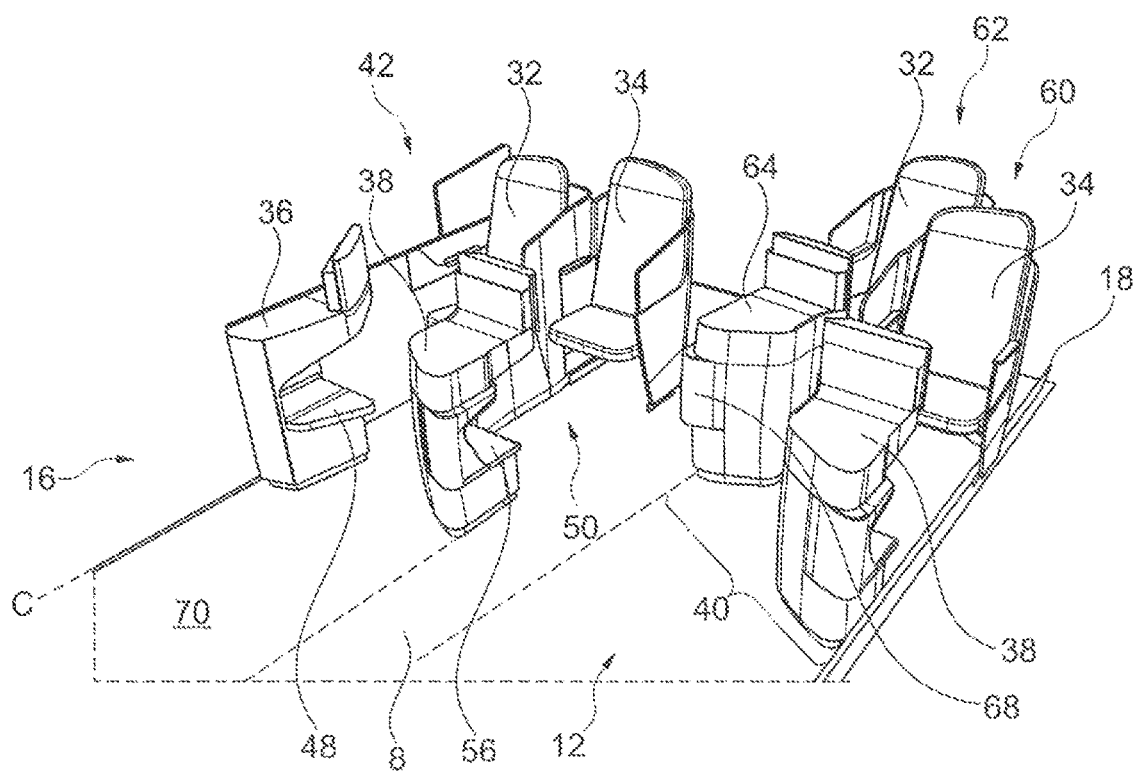
FIG. 3 shows the setup of a seat arrangement in a three-dimensional view.

FIG. 3 shows the total setup in a three-dimensional view, in which in particular the height extension of the ottomans 36, 38 and 64 are apparent. In particular, the supports 48, 56, 68 are arranged in a certain distance from a cabin floor 70, which in particular clearly reduces a disturbance of passengers or board personnel, which move on the aisle 8.

Figure 4:
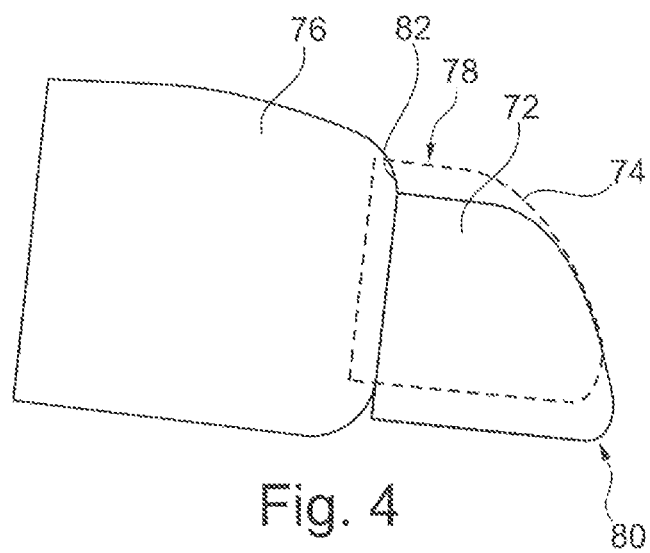
FIG. 4 shows the combination of a support of an ottoman and a seat cushion of a seat module in a reclining position.

In FIG. 4, exemplarily, the combination of a support 72 of an ottoman 74 and a seat surface 76 is shown, which together create a resting surface with the backrest (not shown). The support 72 in this case is designed in a manner, that it is movable between a resting position (shown with dashed lines) 78 and a use position 80. A motion may be accomplished through mechanical, active drive means as well as passively through urging the support 72 from the resting position 78 into the use position 80 through a leading edge 82 of the seat part 76. The special advantage lies in that in a seat position the support 72 protrudes into the aisle 8 to a minimum extent, but however may provide a maximum lying length in a use position. The height of the support 72 bordering the aisle preferably comprises a height of 25 inches (about 63.5 cm) as a maximum. If this is maintained, minimum aisle width of 15 inches (about 38 cm) may be realized based on relevant certification rules.

Figure 5:
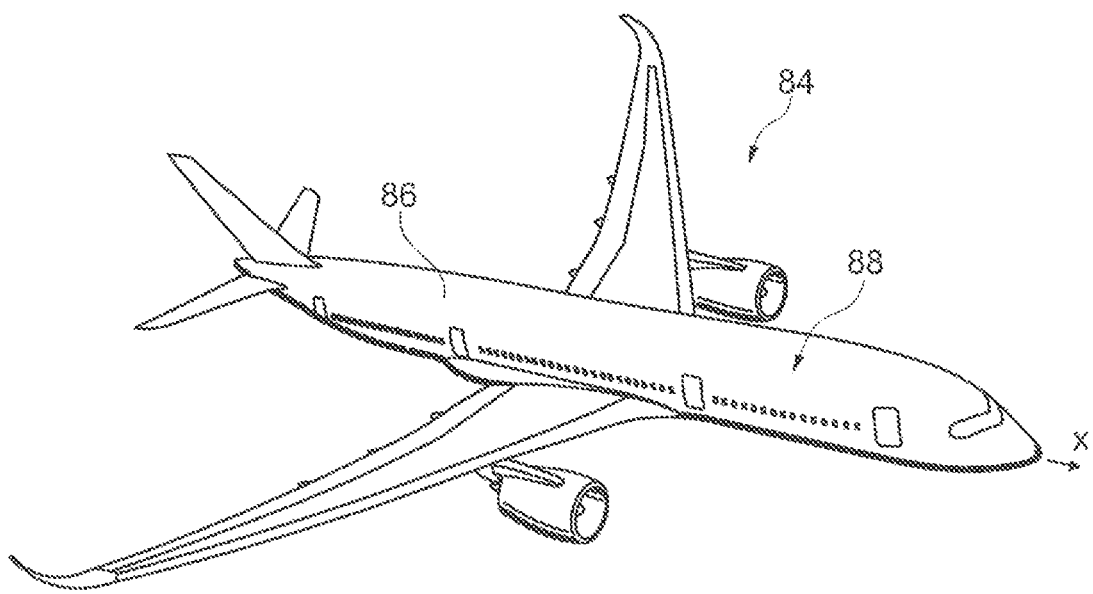
FIG. 5 shows an aircraft having a cabin arranged therein with a seat arrangement described above.

FIG. 5 shows an aircraft 84 having a fuselage 86 and a cabin 88 created therein, which comprises at least one seat arrangement according to the above description.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A seat arrangement for a cabin of a vehicle, comprising:
    two aisles extending parallel and at a distance to each other, which aisles are aligned in a longitudinal direction of the cabin;
    two cabin walls at a distance to each other, the cabin walls arranged parallel to the aisles at least in a region, and laterally delimit the cabin;
    a central passenger region enclosed by the aisles;
    two outer passenger regions neighboring the central passenger region, the outer passenger regions separated from the central passenger region through one of the aisles each and border at one of the two cabin walls;
    wherein a plurality of first seat rows having two inner seat modules and two outer seat modules each, are arranged in the central passenger region in the longitudinal direction one behind each other;
    wherein a plurality of second seat rows, each having an inner seat module facing the respective aisle and an outer seat module wall facing the respective cabin wall are arranged one behind each other in the outer passenger regions in the longitudinal direction;
    wherein each seat module comprises a seat and an ottoman assigned to the seat;
    wherein the seat modules of the central passenger region comprise a use direction, which are aligned parallel to a main extension direction of the bordering aisle or enclose an angle of 4 degrees with the bordering aisle as a maximum in such a way, that the ottoman of the respective seat module reaches further into the respective aisle than the assigned seat,
    wherein a predetermined distance is provided between an ottoman of a seat module facing an aisle and a seat of a seat module in front of the seat module facing the aisle along the longitudinal direction, through which predetermined distance the seat module facing away from the respective aisle is accessible from the respective aisle,
    wherein:
        the ottomans of at least the seat modules that border the aisle comprise a base that is attachable to a cabin floor and a support that is movable relative to the base;
        in a seating position of the respective seat the support is held in a retracted position on the base, in which the support protrudes over the base to a minimum possible extent; and
        in a reclining position the support is deflected into the bordering aisle.

2. The seat arrangement according to claim 1, wherein the seats of two neighboring seat modules comprise a displacement in the longitudinal direction.

3. The seat arrangement according to claim 1, wherein the seats of an outer seat module of the central passenger region comprise a displacement of 12 inches as a maximum.

4. The seat arrangement according to claim 1, wherein the seats of an inner seat module of the outer passenger regions comprise a displacement of at least 16 inches.

5. The seat arrangement according to claim 1, wherein a passage is created between two consecutive inner seat modules in an outer passenger region or two consecutive outer seat modules in the central passenger region, which passage encloses an angle with a main extension direction of a bordering aisle that is in a range of 45 degrees to 135 degrees.

6. The seat arrangement according to claim 1, wherein the inner seat modules of the outer passenger region each comprises a use direction, which encloses an angle of at least 4 degrees to the main extension direction of the respective bordering aisle.

7. The seat arrangement according to claim 1, wherein the ottomans of the seat modules, which border an aisle, comprise a construction depth, which decreases from the aisle towards the seat module facing away from the aisle.

8. The seat arrangement according to claim 1, wherein the usable minimum width of the aisles is at least 15 inches.

9. The seat arrangement according to claim 1, wherein the support is held on the base through a passive mechanism comprising a spring arrangement and is adapted to be pushed into a deflected position through a seat cushion of the seat displaced to the ottoman.

10. The seat arrangement according to claim 1, wherein the support is held on the base through an active mechanism comprising at least one actuator and is adapted for moving into a deflected or retracted position upon moving the seat cushion of the respective passenger seat.

11. The seat arrangement according to claim 1, wherein in a deflected position the support protrudes into the aisle up to a distance of 4 inches.

12. A vehicle comprising a fuselage having a cabin arranged therein, the cabin comprising a seat arrangement according to claim 1.

13. The vehicle according to claim 12, wherein the vehicle is an aircraft.

* * * * *